March 8, 1949.　　　H. J. VETTER　　　2,463,925
SEED SPACING TIMER
Filed Dec. 15, 1947　　　　　　　　2 Sheets-Sheet 1
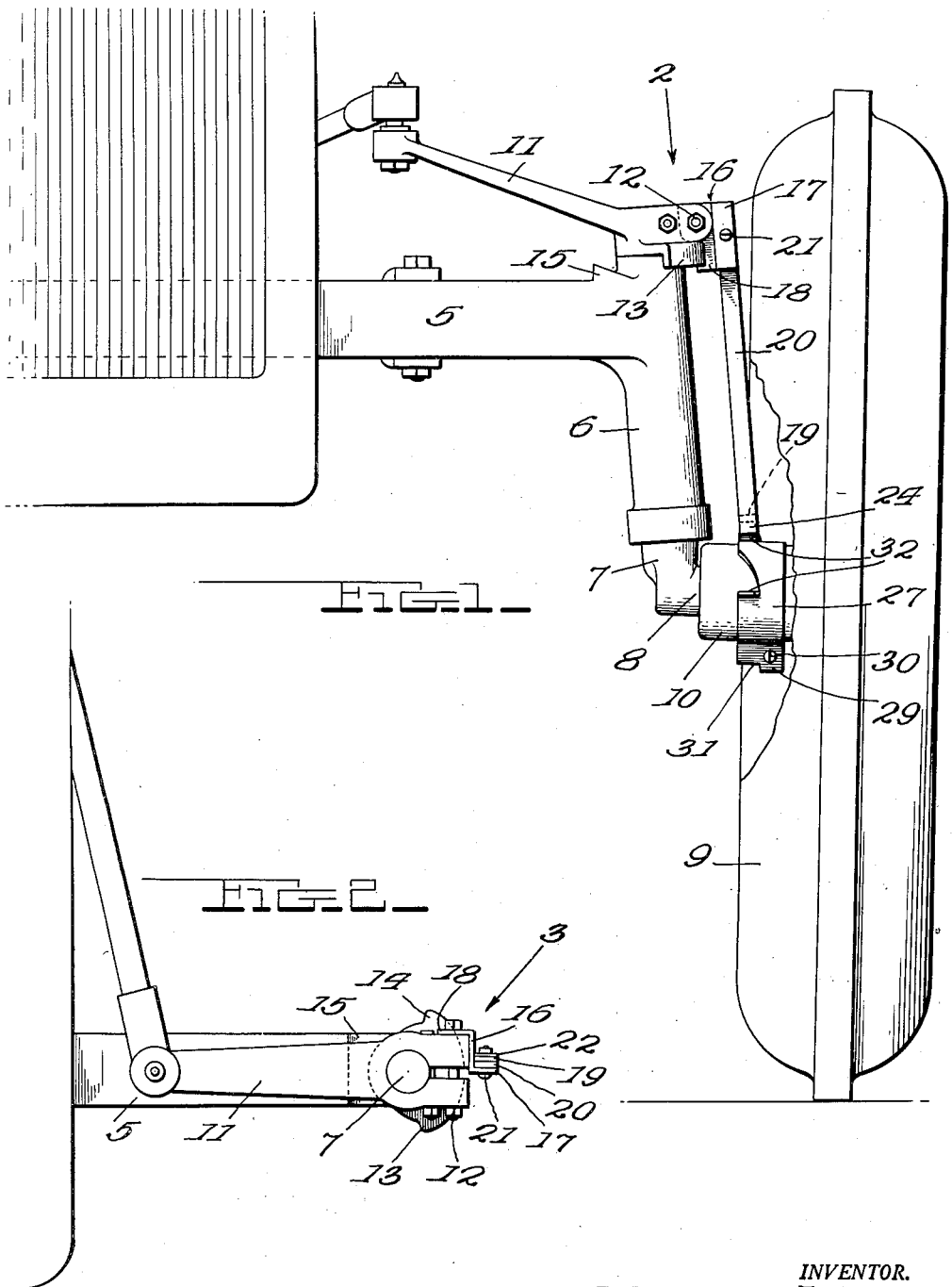
INVENTOR.
Herman J. Vetter
BY
H. B. Wilson & Co.
atty.

March 8, 1949.  H. J. VETTER  2,463,925
SEED SPACING TIMER
Filed Dec. 15, 1947  2 Sheets-Sheet 2
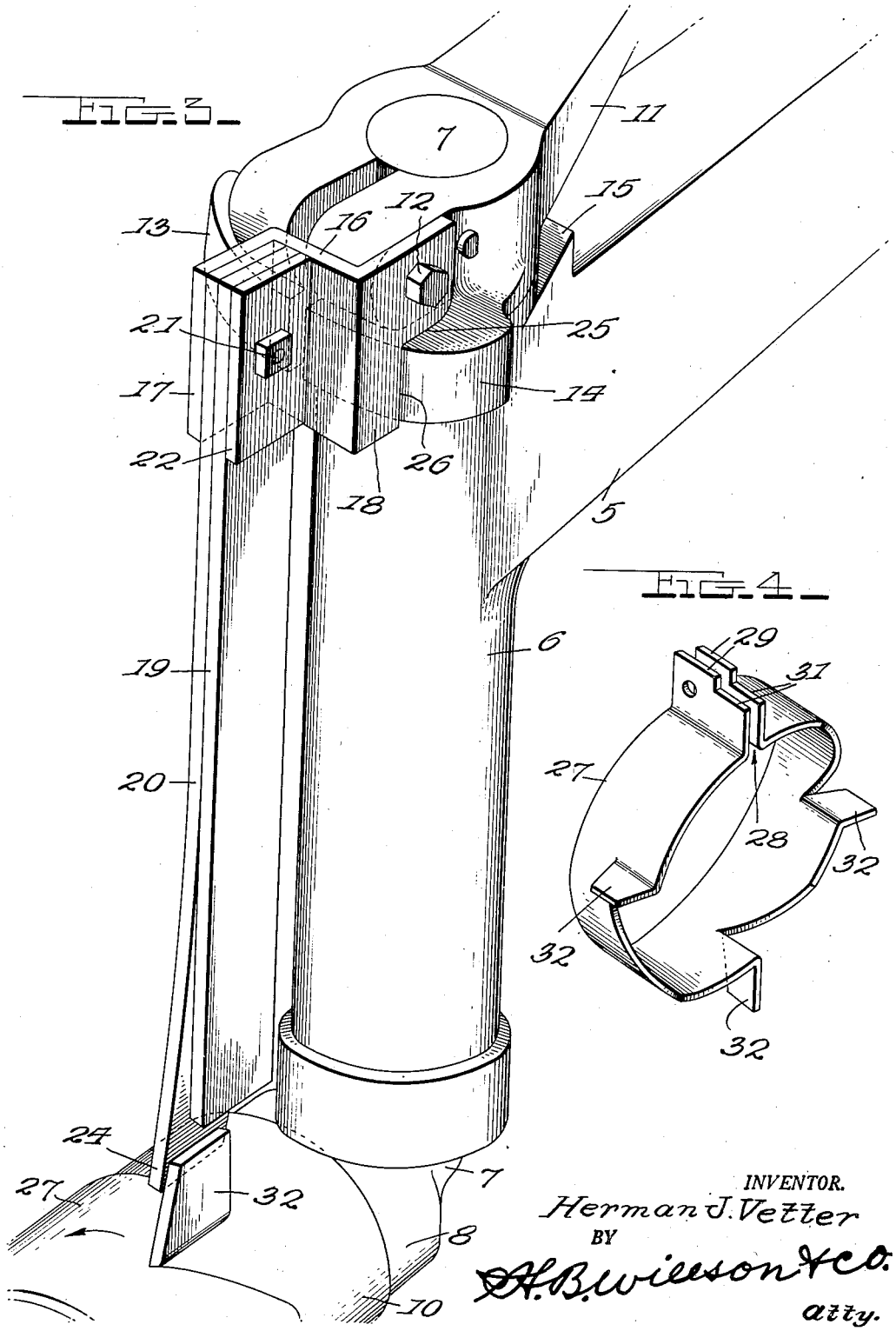
INVENTOR.
Herman J. Vetter
BY
H. B. Wilson & Co.
atty.

Patented Mar. 8, 1949

2,463,925

UNITED STATES PATENT OFFICE 2,463,925

SEED SPACING TIMER

Herman J. Vetter, Calvary, Wis.

Application December 15, 1947, Serial No. 791,685

8 Claims. (Cl. 116—22)

In planting potatoes, it is very desirable to carry the seed potatoes on the farm tractor and drop them by hand through a suitable guide extending to a furrow opener, suitable provision being made for ridging the ground over the dropped seed; and the present invention aims to provide a novel timer for giving an audible signal each time a piece of seed potato should be dropped, to insure the desired spacing of the hills.

In carrying out the above end, a further object is to construct the timer in the form of a simple and inexpensive attachment readily attachable to a common type of farm tractor.

Figure 1 of the accompanying drawings is a fragmentary front elevation, partly broken away, showing the invention attached to a common form of tractor.

Figure 2 is a top plan view as indicated by the arrow 2 of Fig. 1.

Figure 3 is an enlarged perspective view looking in the direction indicated by the arrow 3 of Fig. 2.

Figure 4 is a perspective view of the tappet-carrying band.

A preferred construction has been shown in the drawings and will be rather specifically described, but attention is invited to the possibility of making variations within the scope of the invention as claimed.

I have shown the invention mounted upon a common type of tractor including a front axle 5 having a substantially vertical bearing 6 at each end, a shank 7 turnably mounted in said bearing and having a spindle 8 on its lower end, a front wheel 9 having a hub 10 rotatable on said spindle, and a steering arm 11 secured to the upper end of the aforesaid shank 7, the shank-engaging end of said steering arm being split and being contractable by means of a bolt 12. The steering arm 11 is provided with outwardly and downwardly projecting stop flanges 13 and 14 cooperable with a fixed stop 15 on the axle 5 to limit turning of the wheel 9 in either direction. The bolt 12 is utilized to connect part of the present invention with the steering arm 11, thus mounting said part to turn with the shank 7 during steering.

I provide a vertical bracket plate 16 having one of its ends bent laterally in one direction along a vertical line to provide one vertical flange 17, and the other end of said plate 16 is bent laterally in the opposite direction to provide a second vertical flange 18. A relatively stationary vertical arm 19 and a spring arm 20 are secured in the angle between the central portion of the plate 16 and the flange 17, and are fixedly mounted on said flange by means of a bolt 21 and a suitable washer plate 22. For a purpose to appear, the lower end 24 of the spring arm 20 projects downwardly beyond the lower end of the relatively stationary arm 19, and it may here be explained that when said arm 20 is sprung away from its normal position against the arm 19 and then released, said spring arm will forcibly snap back to said normal position, thus striking the relatively stationary arm 19 and giving a sound signal which is readily audible over the noise of the tractor.

The upper end portion of the above described flange 18 is wider than its lower end portion and is formed with a bolt hole to receive the bolt 12. This relatively wide upper portion of flange 18 is formed with a straight horizontal lower edge 25, and the narrower lower end portion of said flange has a straight free edge 26 disposed vertically at a right angle to said edge 25. Thus, when the bolt 12 is used to clamp the upper portion of the flange 18 to the steering arm 11, the edges 25 and 26 will contact with the stop flange 14 as shown more particularly in Fig. 3, thus holding the entire bracket against pivotal movement upon said bolt.

A metal band 27 is clamped around the inner end of the wheel hub 10 and carries circumferentially spaced tappets for swinging the spring arm 20 away from the relatively stationary arm 19 and then releasing said spring arm, allowing the latter to fly back and strike said arm 19. The band 27 is transversely split as shown at 28 and is provided with lugs 29 at opposite sides of this split, said lugs being connected by a clamping bolt 30. Portions 31 of the lugs 29 coact in forming one of the tappets for operating the spring arm 20. The other tappets 32 may well be stamped outwardly from the band 27, as shown. All of the tappets are of uniform height and coact with the lower extremity 24 of the spring arm 20, as will be clear from Fig. 3.

The tappets of the band 27 are so spaced as to cause the spring arm 20 to give a signal each time the tractor advances a distance corresponding to the desired distance between the hills of potatoes; said signal is distinctly audible over the noise of the tractor; and each time said signal is given, a piece of seed potato is dropped. It is thus insured that the hills of potatoes shall have the desired uniformly spaced relation.

If desired, a plurality of the bands or collars 27 may be supplied with each attachment, said bands or collars having different numbers of tappets, permitting planting of the potatoes with different spacings, for example, twenty-eight inches apart, twenty-one inches apart or seventeen inches apart.

From the foregoing, taken in connection with the accompanying drawings, it will be seen that novel and advantageous provision has been made for carrying out the objects of the invention, and while preferences have been disclosed, attention is again invited to the possibility of making variations within the scope of the invention as claimed.

I claim:

1. In a sounding device for use on a farm tractor, the combination of an axle having a vertical bearing at one end, a vertical shank extending through and rotatable in said bearing, the lower end of said shank having a laterally extending spindle, a steering wheel having a hub rotatable on said spindle, a steering arm at the upper end of said shank, means for securing said steering arm to said spindle including a bolt extending through said arm, a bracket secured to said steering arm by means of said bolt, a rear stationary arm and a front spring arm secured to and projecting downwardly from said bracket, the lower end of said spring arm being extended downwardly beyond the lower end of said stationary arm, said arms being cooperable in giving a sound when said spring arm is sprung forwardly and released and springs back against said stationary arm, and a tappet on the hub of said wheel in cooperative relation with said lower end of said spring arm for first forwardly springing said spring arm and then releasing it.

2. In a sounding device for use on a farm tractor, the combination of an axle having a vertical bearing at one end, a vertical shank extending through and rotatable in said bearing, the lower end of said shank having a laterally extending spindle, a steering wheel having a hub rotatable on said spindle, a steering arm at the upper end of said shank having a split, contractable end to receive the upper end of said shank, said split end of said steering arm also having an outwardly and downwardly projecting flange and a transverse opening located above said flange, a vertical bracket plate in contact with said split end and having one of its ends bent laterally in one direction along a vertical line to provide one vertical flange and its other end bent laterally in the opposite direction along another vertical line to provide a second vertical flange, the latter having an opening to aline with said transverse opening and also having a notch to receive said flange on the split end of said steering arm, a bolt passing through said alined openings to fasten said bracket plate to said steering arm, a rear stationary arm and a front spring arm having their upper ends secured to said one vertical flange of said bracket plate, the lower end of said spring arm being extended downwardly beyond the lower end of said stationary arm, said spring and stationary arms being cooperable in giving a sound when said spring arm is sprung forwardly and released and springs back against said stationary arm, and a tappet on the hub of said wheel in cooperative relation with said lower end of said spring arm for first forwardly springing said spring arm and then releasing it.

3. In a sounding device for attachment to a tractor having a ground wheel, a vertical shank upon the lower end of which said wheel is mounted, a bearing in which said shank is turnably mounted for steering said wheel, a steering arm having a split end, and means for securing the latter to the upper end of said shank, said means including a bolt extending through the split end of said arm, said sounding device comprising a bracket plate for vertical disposition against the split end of a steering arm, said plate having one of its ends bent laterally in one direction along a vertical line to provide one vertical flange, the other end of said plate being bent laterally in the opposite direction along another vertical line to provide a second vertical flange for contact with one side of the split end of a steering arm, said second vertical flange having an opening to receive a bolt passing through the split end of a steering arm, a rear stationary arm and a front spring arm having their upper ends secured to said one vertical flange of said bracket plate, the lower end of said spring arm being extended downwardly beyond the lower end of said stationary arm, said spring and stationary arms being cooperable in giving a sound when said spring arm is sprung forwardly and released and springs back against said stationary arm, and a tappet on the wheel of a tractor in cooperative relation with said lower end of said spring arm for first forwardly springing said spring arm and then releasing it.

4. In a sounding device for attachment to a tractor having an axle with a vertical bearing at one end, a vertical shank extending through and rotatable in said bearing, the lower end of said shank having a laterally extending spindle, a steering wheel having a hub rotatable on said spindle, a steering arm at the upper end of said shank having a split, contractable end to receive the upper end of said shank, said split end of said steering arm also having an outwardly and downwardly projecting flange and a transverse opening located above said flange, and means for securing said steering arm to said spindle including a bolt extending through said transverse opening in said split end, said sounding device comprising a vertical bracket plate in contact with the extremity of the split end of a steering arm, said bracket plate having one of its ends bent laterally in one direction along a vertical line to provide one vertical flange and its other end bent laterally in the opposite direction along another vertical line to provide a second vertical flange, the latter having an opening to aline with a transverse opening in a split steering arm and also having a notch to receive a flange on a split steering arm, whereby said bracket plate will be secured to a steering arm by a single bolt which fastens the steering arm on a wheel spindle shank, a rear stationary arm and a front spring arm having their upper ends secured to said one vertical flange of said bracket plate, the lower end of said spring arm being extended downwardly beyond the lower end of said stationary arm, said spring and stationary arms being cooperable in giving a sound when said spring arm is sprung forwardly and released and springs back against said stationary arm, and a tappet on the hub of a steering wheel in cooperative relation with said lower end of said spring arm for first forwardly springing said spring arm and then releasing it.

5. In a tractor attachment of the class described, a bracket plate for the attachment of a tappet-operated, spring sounding device to the end of a steering arm of a tractor, the steering arm end being split and clamped by a bolt to the top of the shank of a steering wheel spindle, and the sounding device including a stationary arm and a spring arm having superimposed rectangular upper ends, said bracket plate comprising a substantially rectangular plate for vertical disposition against the extremity of the split end of a steering arm and having one of its ends bent laterally in one direction along a vertical line to provide one vertical flange extending at right angles to the intermediate portion of said plate and against which the upper rectangular ends of stationary and spring arms of a sounding device may be secured with their edges abutting the intermediate portion of said plate, and the other end of said plate being bent laterally in the opposite direction along another vertical line to provide a second vertical flange to be positioned against one side of a split end of a steering arm, said second vertical flange having an opening to receive the bolt which clamps the split end of the steering arm to the shank of a steering wheel spindle.

6. In a tractor attachment of the class described, a bracket plate for the attachment of a tappet-operated, spring sounding device to the end of a steering arm of a tractor, the steering arm end being split and clamped by a bolt to the top of the shank of a steering wheel spindle, the split end of the steering arm also having an outwardly and downwardly projecting flange on its lower portion, and the sounding device including a stationary arm and a spring arm having superimposed rectangular upper ends, said bracket plate comprising a substantially rectangular plate for vertical disposition against the extremity of the split end of a steering arm and having one of its ends bent laterally in one direction along a vertical line to provide one vertical flange extending at right angles to the intermediate portion of said plate and against which the upper rectangular ends of stationary and spring arms of a sounding device may be secured with their edges abutting the intermediate portion of said plate, and the other end of said plate being bent laterally in the opposite direction along another vertical line to provide a second vertical flange to be positioned against one side of a split end of a steering arm, said second vertical flange having an opening to receive the bolt which clamps the split end of the steering arm to the shank of a steering wheel spindle, said second vertical flange also having a notch located below said opening to receive an outwardly and downwardly projecting flange on the split end of a steering wheel arm, whereby said bracket plate will be rigidly secured to the steering arm by the bolt that fastens the arm to the shank of the steering wheel spindle.

7. In an attachment of the class described, a one-piece metal band to surround a wheel hub and formed with a plurality of regularly spaced integral tappets, the latter being bent outwardly from said band and being of uniform height, said band having a transverse split and outwardly projecting lugs at opposite sides of said split, said lugs having bolt holes to receive a bolt for tightly contracting said band around a wheel hub, at least one of said lugs having the same height as said tappets, and constituting an additional tappet.

8. In an attachment of the class described, a metal band to surround a wheel hub, said band having a transverse split and outwardly projecting lugs at opposite sides of said split, a bolt extending through said lugs for tightly contracting said band around the wheel hub, and a plurality of regularly spaced tappets of uniform height projecting outwardly from said band, at least one of the aforesaid lugs having the same height as said tappets and constituting another tappet.

HERMAN J. VETTER.

REFERENCES CITED

The following references are of record in the file of this patent:

UNITED STATES PATENTS

| Number | Name | Date |
|---|---|---|
| 379,745 | Ulsh | Mar. 20, 1888 |
| 529,223 | Weaver, Jr. | Nov. 13, 1894 |
| 958,922 | Hinman | May 24, 1910 |
| 1,432,520 | Avery | Oct. 17, 1922 |

FOREIGN PATENTS

| Number | Country | Date |
|---|---|---|
| 513,962 | Germany | Dec. 6, 1930 |